United States Patent [19]

Bujak, Jr.

[11] Patent Number: 5,369,597
[45] Date of Patent: Nov. 29, 1994

[54] SYSTEM FOR CONTROLLING HEATING OR COOLING CAPACITY IN HEATING OR AIR CONDITIONING SYSTEMS

[76] Inventor: Walter E. Bujak, Jr., 7 Magnolia Dr., Suffield, Conn. 06078

[21] Appl. No.: 993,558

[22] Filed: Dec. 21, 1992

[51] Int. Cl.$^5$ .................... F24F 11/00; G06F 15/20; G06F 15/46; G05D 23/00
[52] U.S. Cl. .................. 364/505; 364/551.01; 364/557; 236/1 E; 62/132; 237/2 R; 237/12; 165/1; 165/2; 165/4; 165/32; 432/36
[58] Field of Search ............ 364/551.01, 556, 557, 364/505; 62/132, 172, 117, 161, 162, 203, 214; 165/1, 2, 13, 14, 24, 25, 27, 32, 33; 236/91 D, 91 F, 1 E, 1 EA; 432/36; 237/2 R, 12

[56] References Cited

U.S. PATENT DOCUMENTS 4,506,516  3/1985  Lord ........................... 62/117
5,123,256  1/1992  Oltman ......................... 62/175

*Primary Examiner*—Jack B. Harvey
*Assistant Examiner*—Melanie Kemper

[57] ABSTRACT

A heat pump or air conditioning system includes a process for calculating on a real time basis the capacity contribution of each of a number of heating or cooling stages. The calculated contribution is utilized to determine the number of stages that need to be activated at any point in time in the heat pump or air conditioning system.

11 Claims, 4 Drawing Sheets

SYSTEM FOR CONTROLLING HEATING OR COOLING CAPACITY IN HEATING OR AIR CONDITIONING SYSTEMS

BACKGROUND OF THE INVENTION

This invention relates generally to air conditioning and heat pump systems and more particularly to method and apparatus for controlling the amount of heating or cooling capacity of these systems.

Air conditioning and heat pump systems are commonly driven by a plurality of heating or cooling stages that are selectively activated by a control system in order to achieve a desired amount of heating or cooling capacity. One approach to achieving desired heating or cooling capacity has been to sequentially activate stages until a desired temperature is achieved in the space to be heated or cooled. Another approach has been to selectively activate stages according to which stage has been idle for the longest period of time. Still another approach has been to first calculate the number of stages that will be needed to heat or cool an area to a desired temperature and then only activate that number of stages. This latter approach has been heretofore premised on providing the control system in advance with a predetermined gain value for each stage within the system. This gain value represents the nominal rise or drop in temperature that a given stage will contribute to the total rise or drop in temperature of the media to be heated or cooled. The control system calculates the differential in temperature between the current and desired temperature of the media to be heated or cooled. The control system thereafter proceeds to divide this differential by the aforementioned gain value per each stage. The result is the number of stages that need to be activated to achieve the desired temperature.

It is to be appreciated that the aforementioned calculation of number of stages to be activated is premised on the gain per stage value not varying significantly. This premise cannot be assured under certain circumstances. Specifically, this gain value will vary as a function of the temperature changes or air flow experienced by the condenser or the evaporator within the air conditioning or heat pump system in which the stages are operating. These changes in temperature will in turn affect the pressure differential across a compressor in each activated stage. This may produce a significantly different contribution by each stage to the total system gain than had been previously assumed.

SUMMARY OF THE INVENTION

It is an object of the invention to provide an approach to selectively activating heating or cooling stages within an air conditioning or heat pump system that is premised on the current temperature conditions being experienced by these systems.

It is another object of the invention to selectively activate only those number of heating or cooling stages that will be necessary to achieve a desired temperature based upon the current temperature conditions being experienced by the condensers and evaporators of these systems.

The above and other objects are achieved by providing a control system which continually calculates the differential in temperature occurring across the primary heat exchanging unit of either an air conditioning or heat pump system. This will be an evaporator for an air conditioning system and a condenser for a heat pump system. In either case, the calculated differential will be divided by the number of active heating or cooling stages on the system so as to define a current temperature gain per stage that is being achieved across the primary heat exchanging unit. This temperature gain per stage will thereafter be used to calculate the number of stages which need to be activated. This is accomplished by sensing or computing any difference between actual and desired temperatures in the space that is to be heated or cooled and dividing the difference by the most currently calculated gain per stage. The resultant number will be used to calculate the number of stages to be activated or deactivated. In accordance with another feature of the preferred embodiment, the calculated gain per stage is first compared to minimum and maximum allowable gains per stage with either being appropriately used instead of the calculated gain when necessary. In accordance with still another feature of the preferred embodiment, the control system can operate on either a constant gain per stage that has been provided or on the aforementioned calculation of a current gain per stage.

BRIEF DESCRIPTION OF THE DRAWINGS

Other objects, features, and advantages of the present invention will be apparent from the following detailed description in conjunction with the accompanying drawings in which:

FIGS. 2, 2A and 2B illustrate a program within the control system which calculates a representative contribution being made by each active stage in the heat pump or air conditioning system of FIG. 1.

DESCRIPTION OF THE PREFERRED EMBODIMENT

Figure 1:
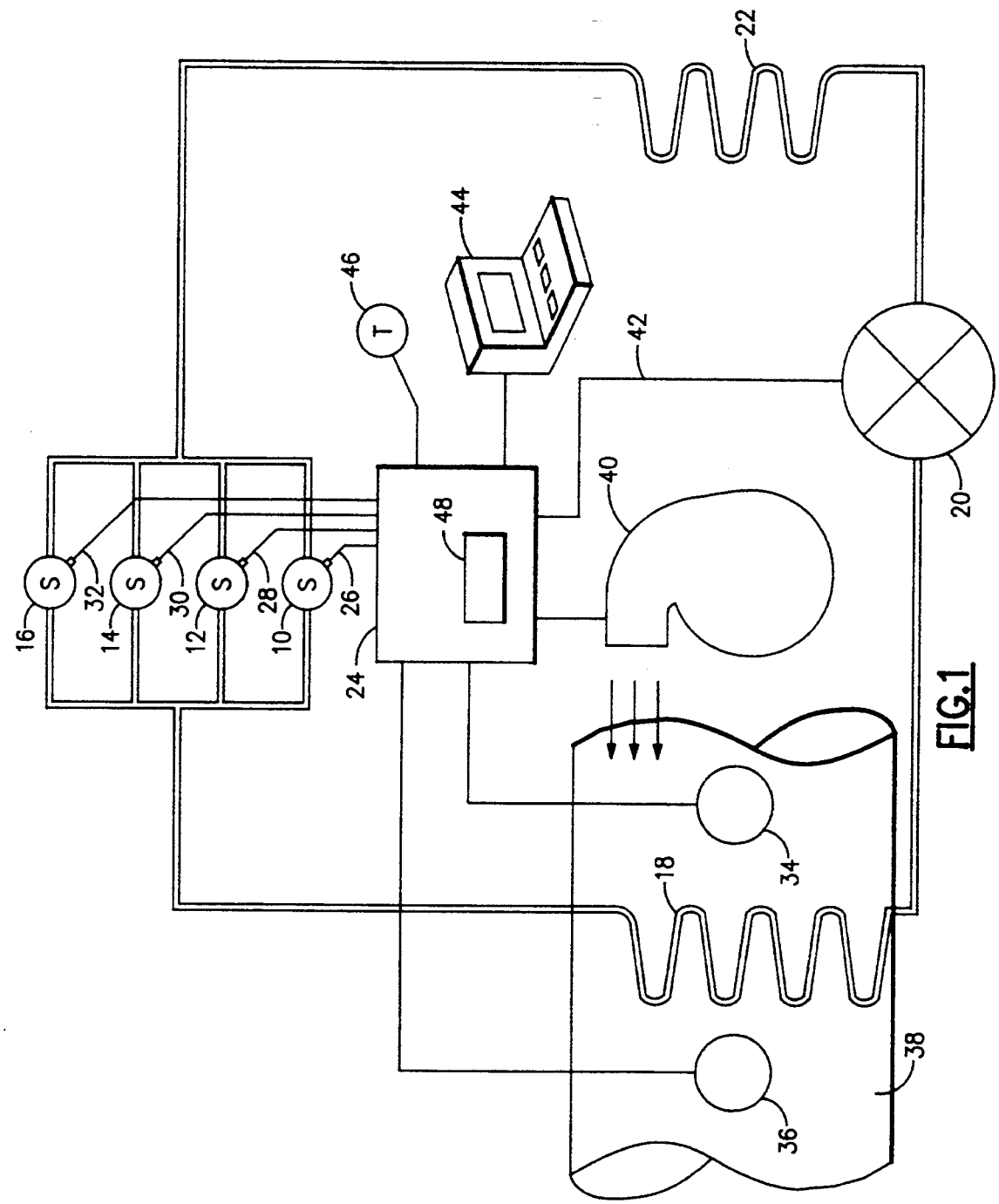
FIG. 1 illustrates a heat pump or air conditioning system having a plurality of heating or cooling stages that are selectively activated by a control system.

Referring to FIG. 1, an air conditioning or heat pump system is seen to include a plurality of heating or cooling stages 10, 12, 14, and 16 which are each capable of providing or taking refrigerant from a primary heat exchange unit 18. The refrigerant furthermore moves through an expansion valve 20 and a secondary heat exchange unit 22 in whichever direction is dictated by the system. In the case of an air conditioning system the primary heat exchange unit will be an evaporator and the secondary heat exchange unit will be a condenser. The primary and secondary heat exchange units will have the reverse functions in the event that the system is a heat pump.

Referring again to the stages 10-16, it is to be noted that each stage is connected to a controller 24 via respective control lines 26, 28, 30 or 32. These control lines will normally provide a signal to an electric actuator within each stage which activates that particular stage. The electric actuator may be a motor, solenoid, contactor or other known device for activating compressors. The controller 24 furthermore interfaces with a sensor 34 which senses the temperature of the air returning from the space being heated or cooled. The controller 24 is also connected to a sensor 36 which senses the air leaving the primary heat exchange unit 18.

In this regard, it is to be appreciated that the air preferably travels through a duct system 38 and traverses the primary heat exchange unit 18 so as to either experience an increase or decrease in temperature depending on whether the heat exchange unit 18 is an evaporator for an air conditioning system or a condenser for a heat pump system. The air flow may be increased or decreased by a fan 40 connected to the controller 24. The controller 24 is also connected to the expansion valve 20 via a line 42.

The controller is furthermore connected to an operator terminal 44 which preferably has a keyboard that may be used to provide information to the system. Such information may for instance include any control parameters that the operator may want to provide from time to time. The controller 24 is still further connected to a sensor 46 which provides a thermostat sensor input to the controller 34. The thermostatic sensor input allows the controller 24 to calculate desired air temperature in a manner well known in the art. It is to be appreciated that such a temperature could be communicated to the controller as a control parameter via the operator terminal 44.

It is to be appreciated that the controller 24 preferably includes a programmable microprocessor 48 which receives the information from the operator terminal 44 as well as the sensors 34, and 36 and the thermostatic sensor 46 and controls the heating or cooling stages 10–16. The control is pursuant to a set of programs stored in memory within the controller that is accessed and executed by the microprocessor in a manner well known in the art.

Figure 2A:
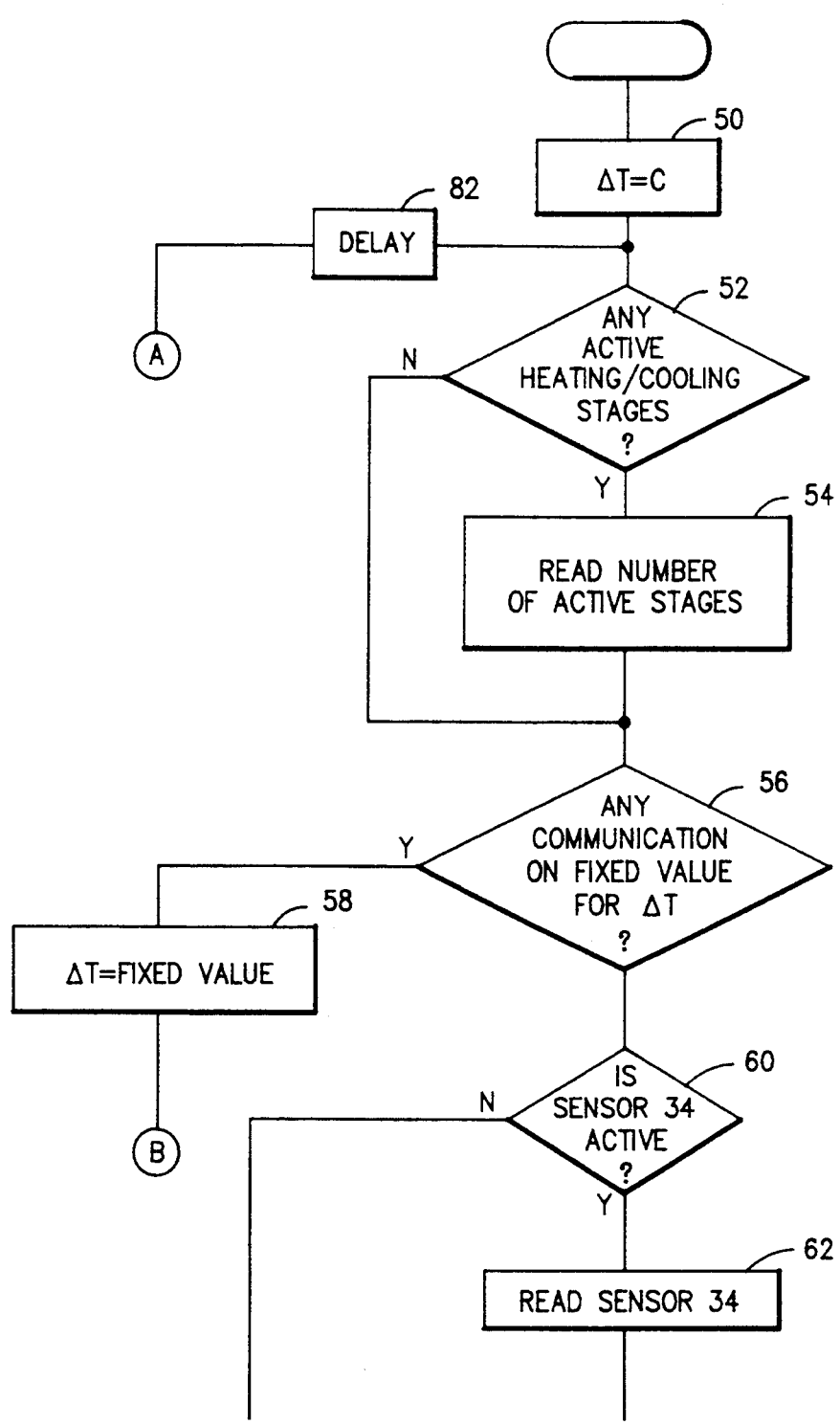
Figure 2B:
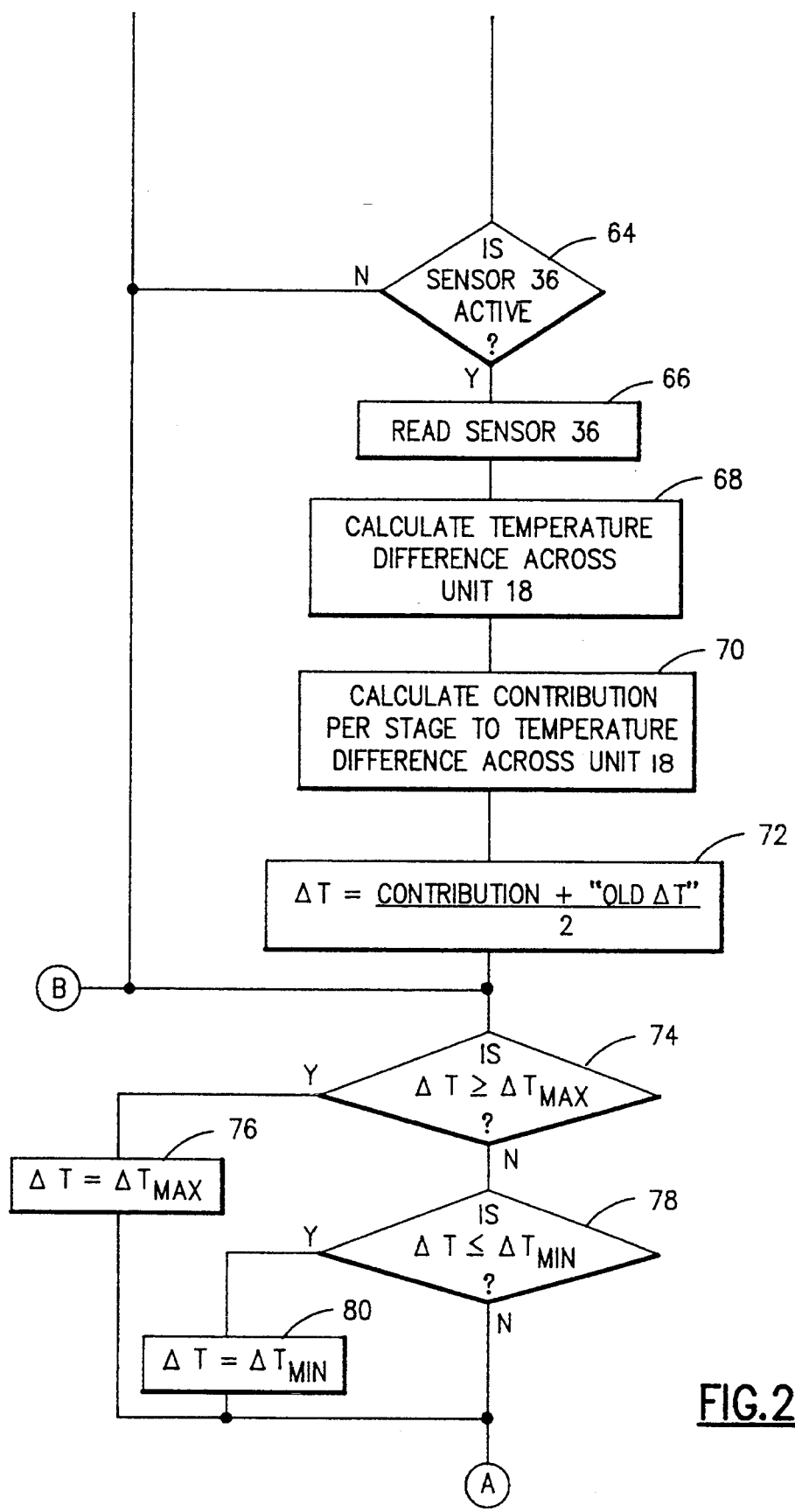

Referring to FIG. 2, a first program residing within the microprocessor is seen to begin with a step 50 wherein a variable "$\Delta T$" is set equal to a constant "C". The program proceeds to a step 52 and inquires as to whether any heating or cooling stages have been activated by the controller 24. If the answer is yes, the microprocessor proceeds to a step 54 and reads the number of active stages. This is done by noting whether any of the control lines 26 through 32 are carrying a control signal that is activating one of the stages 10 through 16. The number of so noted control lines is counted in step 54 and stored for latter use. Referring again to step 52, it is noted that in the event that no stages have been activated, the microprocessor will proceed from step 52 to a step 56 which is also the next step for the microprocessor proceeding from step 54. Referring to step 56 the microprocessor now inquires as to whether any operator communication has been received from the operator terminal 44 regarding a fixed value to be assigned to the variable "$\Delta T$". This requires the microprocessor to simply note whether or not a communication has been received from the operator terminal 44 at this point in the control program. In the event that a communication has been so received, the microprocessor will proceed to a step 58 and set the variable "$\Delta T$" equal to the fixed value received. The microprocessor will thereafter proceed to a point B in the control program which appears in FIG. 2B. Referring again to step 56, in the event that no operator communication has been received from the operator terminal 44, the microprocessor will proceed to a step 60 and inquire as to whether the sensor 34 is active. If the answer is no, the microprocessor will proceed from the step 60 to the same terminal point B as has been heretofore mentioned. In the event that the sensor 34 is active, the microprocessor will proceed to a step 62 and read the entering air temperature sensed by the sensor 34. The microprocessor will now proceed to a step 64 and ask whether the sensor 36 is active. In the event that the sensor 36 is not active, the microprocessor will once again proceed to the point B in the control program. The microprocessor will otherwise proceed to a step 66 and read the leaving air temperature sensed by the sensor 36. Referring to FIG. 1 it is to be noted that the control program has at this point in time sensed an entering air temperature relative to the primary heat exchange unit 18 and has furthermore read a leaving air temperature relative to the same primary heat exchange unit. Referring again to FIG. 2B, the microprocessor proceeds from step 66 to step 68 and calculates the sensed differential temperature across the primary heat exchange unit 18. This is done by subtracting the entering air temperature read in step 62 from the leaving air temperature read in step 66. The microprocessor will now proceed to a step 70 and divide the differential temperature calculated in step 66 by the number of active stages read in step 54. It is to be appreciated that the result of the calculation in step 70 represents an estimated contribution on a per stage basis to the temperature difference experienced across the primary heat exchange unit 18. The microprocessor now proceeds from the step 70 to a step 72 wherein a new value is calculated for the variable "$\Delta T$". In this regard, the estimated contribution per stage calculated in step 70 is added to the old value of "$\Delta T$" and the result is divided by two. The result is set equal to "$\Delta T$" in step 72. It is to be appreciated that the variable $\Delta T$ is at this point an adjustment of the estimated contribution in step 70. The microprocessor now proceeds to a step 74 wherein it should first be noted that the junction B occurs upstream thereof. In this regard, any exit out of either step 56, step 60, or step 64 as herein before discussed will result in the microprocessor proceeding to step 74. Referring to step 74, the microprocessor asks whether "$\Delta T$" is equal to or greater than a maximum "$\Delta T$". It is to be appreciated that the microprocessor will have previously received certain constants including a value for maximum "$\Delta T$". In the event that the calculated "$\Delta T$" is greater than or equal to the maximum "$\Delta T$", the microprocessor proceeds from step 74 to a step 76 and sets "$\Delta T$" equal to maximum "$\Delta T$". The microprocessor will proceed to a terminal junction "A" within the program which will be described hereinafter. Referring again to step 74, in the event that "$\Delta T$" is less than maximum "$\Delta T$", the microprocessor will proceed to a step 78 and inquire as to whether the calculated "$\Delta T$" is less than or equal to a minimum "$\Delta T$". This minimum "$\Delta T$" will have been previously provided to the microprocessor in much the same way as has been discussed relative to the maximum "$\Delta T$" value. In the event that the calculated "$\Delta T$" is less than or equal to the minimum "$\Delta T$", the microprocessor proceeds to a step 80 and sets "$\Delta T$" equal to the minimum "$\Delta T$". Referring now to steps 76, 78 and 80, it is to be noted that the microprocessor will exit from each step to a common junction "A" in the program. It is to be appreciated that a "$\Delta T$" has been established at this point in time in the program. The "$\Delta T$" will either be the maximum allowable "$\Delta T$" as a result of step 76 or the minimum allowable "$\Delta T$" as a result of step 80 or the calculated "$\Delta T$" as a result of passing through step 78. It is to be understood that the calculated value of "$\Delta T$" at any one time represents a calculated mathematical estimate of what each active stage in the system of FIG. 1 is contributing to the total temperature gain of the system. Referring to junction "A" in the program, it is seen that this junction defines a loop from each of steps 76, 78, or 80 back to a delay step 82. The delay step 82 is preferably a resettable clock which clocks out after a predetermined period of time. The predetermined period of time is such as to allow the system of FIG. 1 to stabilize after any adjustments have been made to it as a result of the ΔT calculation. The clock is also resettable in delay step 82 so as to allow the clock to be reset back to its initial point in the event that the system of FIG. 1 is actually determined to need adjustment by another program which will be described hereinafter. This in effect allows the other program to dictate when the program of FIGS. 2A and 2B can again proceed to calculate another ΔT. In this manner, the program is not permitted to proceed to step 52 until ample time has passed for the system to adjust to the presently calculated "ΔT".

Figure 3:
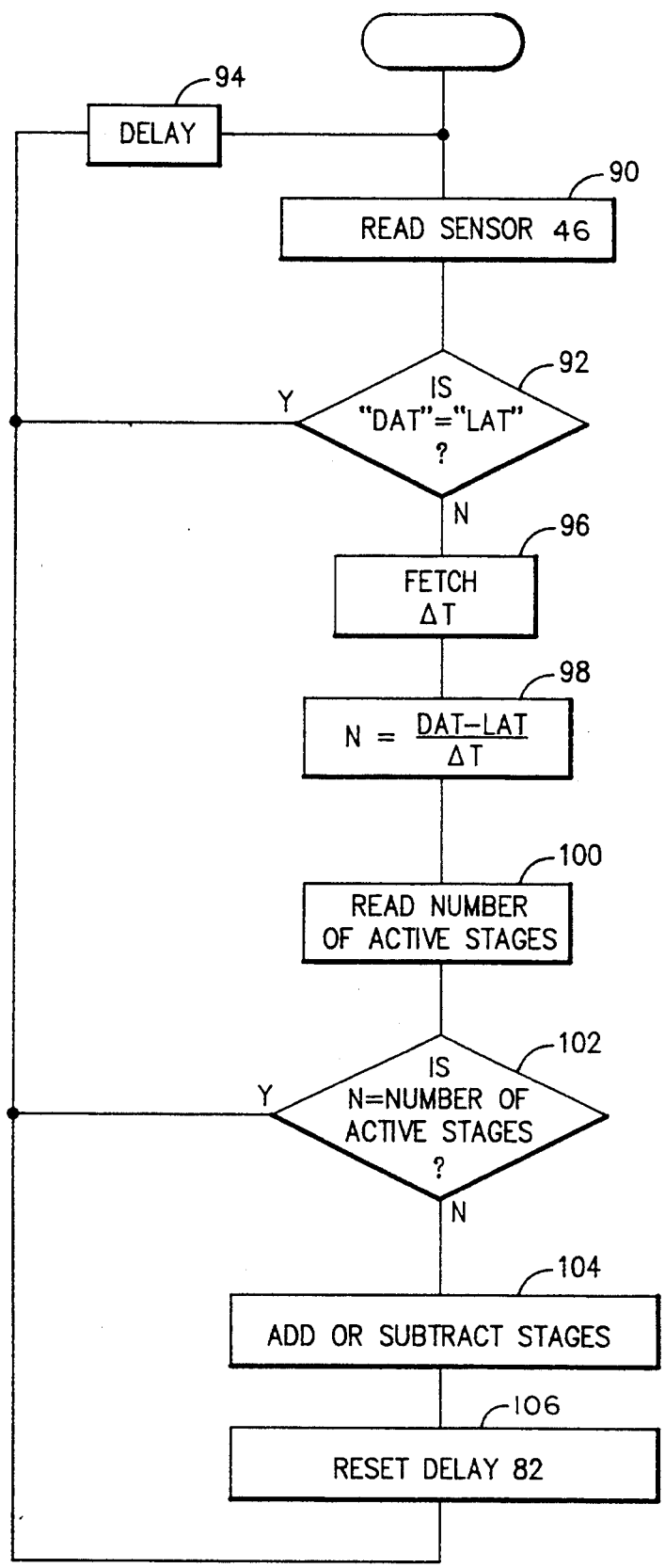
FIG. 3 illustrates a control program within the control system which selectively activates the heating or cooling stages in response to the calculated contribution per stage being made in the program of FIG. 2.

Referring now to FIG. 3, a control program is seen to begin with a step 90 wherein a desired air temperature, "DAT", is read from sensor 46. It is to be appreciated that the desired air temperature could also be calculated by the controller 24 or provided as an input from the operator terminal 44 as has been previously described. The microprocessor proceeds to a step 92 and inquires as to whether the desired air temperature, "DAT", is equal to the leaving air temperature, "LAT", sensed by the sensor 36 in FIG. 1. In the event that these temperatures are equal, the microprocessor will proceed to exit from the step 92 to a step 94 which introduces a time delay before again reading the thermostatic sensor 46 in step 90. Referring again to step 92, in the event that the desired air temperature, "DAT", does not equal the leaving air temperature, "LAT", the microprocessor will proceed to a step 96 and fetch "ΔT" from the program of FIGS. 2A and 2B. It will be remembered that the "ΔT" in the program of FIGS. 2A and 2B is the result of having recently calculated the contribution by each active stage to the temperature gain for the entire system of FIG. 1 in step 70 and further adjusting that contribution in either steps 72, 76 or 80. Referring again to step 96 in FIG. 3, it is seen that the microprocessor proceeds to a step 98 and first calculates the difference between the desired air temperature, "DAT", and the leaving air temperature, "LAT", and divides the result by the "ΔT" fetched in step 96. It is to be appreciated that the result of the calculation performed in step 98 will be a number "N" indicating how many heating or cooling stages need to be active in order to achieve the desired air temperature, "DAT". The microprocessor will now proceed to a step 100 and read the actual number of activated stages in the system. The number of thus read activated stages will be compared with the number of active stages needed in step 102. If the answer is yes, the microprocessor will proceed back to the time delay step 94. Referring back to step 102, in the event that the number of activated stages read in step 100 is not equal to the desired number of stages, "N", calculated in step 98, the microprocessor will proceed to a step 104 and add or subtract stages so as to bring the number of activated stages into agreement with the number of required stages calculated in step 98. The microprocessor will next proceed out of step 104 to a step 106 wherein the time delay of step 82 in the program of FIGS. 2A and 2B is reset. The reset of the clocked delay in step 82 will allow the system of FIG. 1 to stabilize after the addition or subtraction of the stages dictated by step 104. In this manner, the program of FIGS. 2A and 2B will not be generating a new "ΔT" until after the system of FIG. 1 has stabilized. The microprocessor will now proceed to the time delay step 94. The time delay initiated in step 94 will be related to the amount of time which the control system deems appropriate before again beginning the sensing and correcting process of steps 90–104.

It is to be appreciated from the above that both the programs of FIGS. 2A and 2B and FIG. 3 operate asynchronously. The execution of the program of FIGS. 2A and 2B will however be controlled by the program of FIG. 3 when the delay 82 is reset as has been previously discussed. The control program of FIG. 3 will in conjunction with the program of FIGS. 2A and 2B adjust the number of heating or cooling stages needed to achieve the desired air temperature, "DAT". This will be done in accordance with a current and timely calculated contribution per stage being provided by the program of FIGS. 2A and 2B.

While the invention has been described with respect to the aforementioned preferred embodiment, it will be appreciated that many modifications and changes may be made by those skilled in the art without departing from the scope of the invention. It is therefore intended that the scope of the present invention be limited only by the scope of the following claims.

What is claimed is:

1. A process for selectively activating stages of heating or cooling associated with a primary heat exchange unit, said process comprising the steps of:
   sensing temperatures of a medium flowing across said primary heat exchange unit;
   calculating a temperature differential from the sensed temperatures occurring in the medium flowing across the primary heat exchange unit;
   counting the number of active stages;
   dividing the calculated temperature differential occurring in the medium flowing across the primary heat exchange unit by the number of currently counted active stages so as to define a currently calculated contribution by each stage;
   adding the currently calculated contribution by each stage to a previously determined contribution per stage and dividing by a constant so as to define an adjusted current contribution by each stage;
   using the adjusted current contribution by each stage to calculate the number of heating or cooling stages that need to be active in order to achieve a desired temperature in a space to be heated or cooled by the medium flowing across the primary heat exchange unit; and
   selectively activating the required number of heating or cooling stages.

2. The process of claim 1 wherein the constant is two.

3. The process of claim 1 wherein said step of using the adjusted current contribution by each stage comprises the steps of:
   comparing the adjusted current contribution by each stage with maximum and minimum allowable contributions by each stage; and
   substituting the maximum or minimum allowable contribution for the adjusted current contribution when the adjusted current contribution is not within the range defined by the maximum and minimum allowable contributions.

4. The process of claim 1 wherein said step of using the adjusted current contribution by each stage to calculate the number of heating or cooling stages that need to be active comprises the steps of:

receiving a desired temperature to be achieved;

sensing the temperature of the medium leaving the primary heat exchange unit;

dividing a differential between the desired temperature and the sensed temperature of the medium leaving the primary heat exchange unit by the adjusted current contribution per stage so as to thereby define the number of heating or cooling stages that need to be active.

5. The process of claim 1 further comprising:

sensing an operator communication concerning a fixed value to be assigned as the contribution per stage; and inserting the communicated fixed value as the adjusted current contribution by each stage.

6. The process of claim 1 further comprising the step of:

delaying said step of calculating a temperature differential from the sensed temperatures occurring in the medium flowing across the primary heat exchange unit for a predetermined period of time following the selective activation of the required number of heating or cooling stages.

7. In a heating or cooling system having a plurality of heating or cooling stages associated with a heat exchange unit that heats or cools a medium flowing thereover, a process for selectively activating the heating or cooling stages comprising the steps of:

calculating a difference between temperatures of the medium occurring upstream and downstream of the heat exchange unit;

counting the number of active heating or cooling stages;

dividing the calculated difference between the upstream and downstream temperatures of the medium by the number of active heating or cooling stages so as to define a currently calculated temperature difference per active stage;

adjusting the currently calculated temperature difference per active stage by adding an amount which equals any immediately preceding temperature difference per active stage that has been calculated and adjusted and dividing the result by a constant so as to define a currently calculated temperature difference per active stage that has been adjusted;

timing out a predefined delay before again calculating the difference between the temperatures of the medium occurring upstream and downstream of the heat exchange unit;

calculating, during the timing out of the predefined delay, the difference between a desired temperature to be achieved and a temperature of the medium leaving the heat exchange unit so as to define a temperature difference between the desired temperature and the temperature of the medium leaving the heat exchange unit;

dividing, during the timing out of the predefined delay, the temperature difference between the desired temperature to be achieved and the temperature of the medium leaving the heat exchange unit by the currently calculated temperature difference per active stage that has been adjusted so as to define a calculated number of stages needed to heat or cool the medium flowing over the heat exchange unit; and selectively activating heating or cooling stages when the calculated number of stages needed does not equal the number of currently active stages.

8. The process of claim 7 wherein the constant is two.

9. The process of claim 7 further comprising the steps of:

resetting the timing out of a predefined delay before again calculating the difference in temperatures occurring in the medium upstream and downstream of the heat exchange unit when heating or cooling stages are to be selectively activated by said step of selectively activating heating or cooling stages.

10. The process of claim 7 further comprising the steps of:

comparing the value of the calculated temperature difference per active stage that has been adjusted with maximum and minimum values allowed for the currently calculated temperature difference per active stage that has been adjusted; and substituting the maximum or minimum value as the value of the currently calculated temperature difference per active stage that has been adjusted when the value of the currently calculated temperature difference per active stage that has been adjusted is not within the range of maximum and minimum values.

11. The process of claim 7 further comprising the steps of:

sensing a communication concerning a fixed value that is to be the assigned temperature difference per stage; and immediately proceeding to said steps of calculating the difference between a desired temperature to be achieved and a temperature of the medium leaving the heat exchange unit and thereafter dividing the temperature difference between the desired temperature to be achieved and the temperature of the medium leaving the heat exchange unit by the assigned temperature difference per stage so as to define a calculated number of stages needed to heat or cool the medium flowing over the heat exchange unit.

* * * * *